United States Patent
Patil et al.

(10) Patent No.: US 9,274,870 B2
(45) Date of Patent: Mar. 1, 2016

(54) MONITORING CONNECTION QUALITY

(75) Inventors: Pallavi Patil, Singapore (SG); Tralvex Yeap, Singapore (SG)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 131 days.

(21) Appl. No.: 13/700,836

(22) PCT Filed: Feb. 10, 2012

(86) PCT No.: PCT/US2012/024693
§ 371 (c)(1),
(2), (4) Date: Nov. 29, 2012

(87) PCT Pub. No.: WO2013/119253
PCT Pub. Date: Aug. 15, 2013

(65) Prior Publication Data
US 2013/0212442 A1    Aug. 15, 2013

(51) Int. Cl.
*G06F 11/07* (2006.01)
*H04L 12/26* (2006.01)
*H04L 12/24* (2006.01)

(52) U.S. Cl.
CPC ........ *G06F 11/0766* (2013.01); *H04L 41/0645* (2013.01); *H04L 41/0681* (2013.01); *H04L 43/0882* (2013.01); *H04L 43/10* (2013.01)

(58) Field of Classification Search
CPC ... G06F 11/0766; G06F 21/10; G06F 9/4812; G06F 9/54
USPC ....................................................... 714/47.1
See application file for complete search history.

(56) References Cited

U.S. PATENT DOCUMENTS

| | | | |
|---|---|---|---|
| 5,754,774 A | 5/1998 | Bittinger et al. | |
| 6,850,866 B2 | 2/2005 | Couchot et al. | |
| 7,917,601 B1* | 3/2011 | Peiffer | 709/219 |
| 2002/0099818 A1 | 7/2002 | Russell et al. | |
| 2002/0184568 A1* | 12/2002 | Kurrasch | 714/39 |
| 2003/0097428 A1 | 5/2003 | Afkhami et al. | |
| 2005/0138432 A1 | 6/2005 | Ransom et al. | |
| 2006/0203810 A1* | 9/2006 | Owens et al. | 370/355 |
| 2007/0083649 A1 | 4/2007 | Zuzga et al. | |
| 2007/0136480 A1 | 6/2007 | Stephenson et al. | |
| 2007/0192246 A1 | 8/2007 | Futamase | |
| 2007/0280105 A1 | 12/2007 | Barkay et al. | |
| 2008/0114875 A1 | 5/2008 | Anastas et al. | |
| 2008/0133775 A1* | 6/2008 | Peterson et al. | 709/248 |
| 2008/0239944 A1* | 10/2008 | Golla | H04L 41/0681 370/216 |
| 2010/0306365 A1* | 12/2010 | Gale et al. | 709/224 |
| 2010/0325287 A1 | 12/2010 | Jagadeeswaran et al. | |
| 2011/0069685 A1 | 3/2011 | Tofighbakhsh | |
| 2011/0239219 A1* | 9/2011 | Fulton et al. | 718/103 |

(Continued)

OTHER PUBLICATIONS

QoSockets: a new extension to the sockets API for end-to-end application QoS management Computer Networks 35 (2001), P.G.S. Florissi, Y. Yemini, D. Florissi.

(Continued)

*Primary Examiner* — Jigar Patel
(74) *Attorney, Agent, or Firm* — Brundidge & Stanger, P.C.

(57) ABSTRACT

In one example monitoring connection quality, data transceiving at a socket may be monitored by frequent pinging. Any error codes identified by the socket may be assigned a corresponding error description, which may then be transmitted to a proper entity for correction.

21 Claims, 4 Drawing Sheets

(56) References Cited

U.S. PATENT DOCUMENTS

2012/0239817 A1* 9/2012 Ensing et al. .............. 709/228
2012/0324569 A1* 12/2012 Diehl et al. .................. 726/14

OTHER PUBLICATIONS

The Benefits of Third-Party Content Monitoring—White Paper—Keynote: The Mobile & Internet Performance Authority™.
Foundations of Location Based Services Lesson 1 CartouCHe1—Lecture Notes on LBS, V. 1.0, Stenger, S., Neun, M. & Edwardes, A.
Peer-to-Peer Computing, Milojicic, D.S. et al., 2002.
IBM i—Programming Socket programming 7.1.
The Open Group Base Specifications Issue 6, IEEE Std 1003.1, 2004 Edition.
Select function (Windows)—http://msdn.microsoft.com/en-us/library/ms740141(v=vs.85).aspx.
Windows Sockets Error Codes (Windows)—http://msdn.microsoft.com/en-us/library/ms740668(v=vs.85).aspx.
Location-Based Services for Mobile Telephony: a Study of Users' Privacy Concerns, Barkhuus, L. & Dey, A., 2003.
Analyzing Peer-To-Peer Traffic Across Large Networks, Sen, S. & Wang, J., 2002. In Proceedings of the 2nd ACM SIGCOMM Workshop on Internet measurement Abstract only.
International Search Report and Written Opinion from International Application No. PCT/US12/24693 mailed Jul. 13, 2012.

* cited by examiner

MONITORING CONNECTION QUALITY

This Application is the National Stage filing under 35 U.S.C. §371 of PCT Application Ser. No. PCT/US12/24693 filed on Feb. 10, 2012. The disclosure of the PCT Application is hereby incorporated herein by reference in its entirety.

TECHNICAL FIELD

The implementations and embodiments described herein pertain generally to systems, techniques, and programs for facilitating a high-level of quality of service and experience for network-enabled applications.

BACKGROUND

Mobile service providers provide not only voice and data services but also next-generation mobile application services that are provided by third-party application providers. Such third-party applications are increasing in popularity, based on desire and necessity, and therefore may cause stress on network connectivity and bandwidth availability. Thus, mobile service providers, as well as users of the mobile devices, are left with the challenge of assuring that network connectivity, and sufficient bandwidth, are always provided or, at the very least, that any interruptions are brief.

SUMMARY

In one example embodiment, a computer-readable medium stores one or more executable instructions that, when executed, cause one or more processors to monitor data signal transceiving at a communications socket, determine that an error has occurred in connection with at least one identified facet of the transceiving, extract the error code of the last error that occurred, and report the error in connection with the at least one identified facet, along with the error code, to an error correcting entity.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Figure 1:
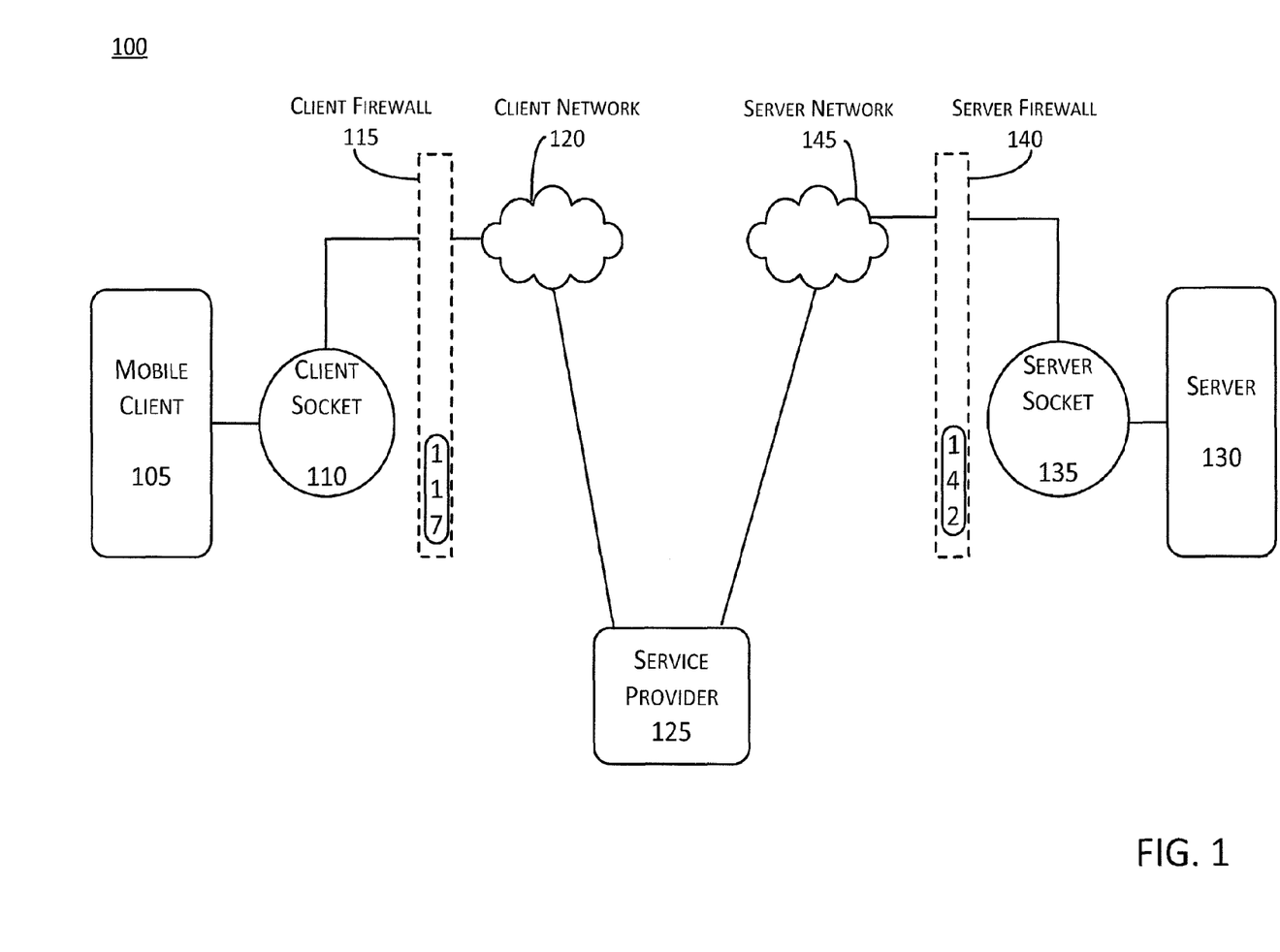
FIG. 1 shows an example system configuration for monitoring connection quality, in accordance with at least the embodiments described herein.

FIG. 1 shows an example system configuration 100 for monitoring connection quality, in accordance with at least the embodiments described herein.

Mobile client 105 may refer to any one of computing devices, including, e.g., mobile phones, smart phones, laptop computers, tablet/slate devices, personal digital assistants (PDAs), global positioning system (GPS) devices, or gaming devices that may be communicatively connected to other devices, e.g., a server, via a wireless network, e.g., a wireless local area network technology (WLAN), e.g., Wi-Fi.

Client socket 110 may refer to a client-side internet or network socket that is an endpoint of bidirectional communication flow across the aforementioned wireless network. Further, if there are multiple mobile clients 105, unique dedicated client-server socket connections for each of the mobile clients are made, directly or indirectly, to server 130.

Client firewall 115 may refer to a device designed to permit or deny network transmissions to mobile client 105 based upon a set of rules. More particularly, client firewall 115 may be utilized to protect mobile client 105 by only allowing legitimate, i.e., authorized or sanctioned communications to pass to or from mobile client 105.

As shown in FIG. 1, client firewall 115 is depicted by a series of dashed lines to indicate that, according to at least some embodiments disclosed and implied by the present description, the presence of client firewall 115 is optional relative to the presence of server firewall 140. That is, the embodiments described herein may contemplate the presence of both client firewall 115 and server firewall 140 or either one of client firewall 115 and server firewall 140.

Monitor 117 may refer to software, hardware, firmware, or any combination thereof, coupled or integrated physically or communicatively to client firewall 115 to monitor the status of data transmitted to and from client socket 110, particularly to determine whether there are any transceiving errors. As a non-limiting example, monitor 117 may send frequent heartbeat signals to client socket 110, based upon which monitor 117 may analyze the performance of transceiving at the socket.

Client network 120 may refer to a wireless local area network (WLAN), e.g., Wi-Fi, to connect mobile client 105 and other devices to the wider Internet via service provider 125.

Service provider 125 may refer to an entity that provides web, i.e., the Internet, services to other entities. It is by service provider 125 that third-party applications may be delivered to mobile client 105. Such third-party applications may include, as non-limiting examples due to the enormous volume available at present, interactive gaming applications, social media applications, downloadable media files (e.g., movies, music, etc.), etc.

Server 130 may refer to a server that hosts a third-party application that may be purchased or otherwise downloaded to mobile client 105, and that may be communicatively connected to other devices, e.g., other servers or mobile client 105, via a wireless network, e.g., a wireless local area network technology (WLAN), e.g., Wi-Fi. Accordingly, server 130 may, as an example, refer to a third-party application service provider, although alternative embodiments may contemplate server 130 being hosted and operated by service provider 125, e.g., Android Market, Apple iTunes, Apple App Store, Blackberry App World, Windows Phone Marketplace, and Amazon Appstore.

Server socket 135 may refer to a server-side internet or network socket that is an endpoint of bidirectional communication flow across the aforementioned wireless network. Further, if there are multiple mobile clients 105, unique dedicated sockets may be opened for each direct or indirect connection between a mobile client 105 and server 130.

Server firewall 140 may refer to a device designed to permit or deny network transmissions to or from server 130 based upon a set of rules. More particularly, client firewall 115 may be utilized to protect server 130 by only allowing legitimate, i.e., authorized or sanctioned communications to pass to or from server 130.

As set forth above regarding client firewall 115, server firewall 140 may also be depicted by a series of dashed lines to indicate that, according to at least some embodiments disclosed and implied, the presence of server firewall 140 may be optional relative to the presence of client firewall 115. That is, the embodiments described herein may contemplate the presence of both client firewall 115 and server firewall 140 or either one of client firewall 115 and server firewall 140.

Monitor 142 may refer to software, hardware, firmware, or any combination thereof, coupled physically or communicatively to server firewall 140 to monitor the status of data transmitted to and from server socket 135, particularly to determine whether there are any transceiving errors. As a non-limiting example, monitor 142 may send frequent heartbeat signals to server socket 135, based upon which monitor 142 may analyze the performance of transceiving at the socket.

Server network 145 may refer to a wireless local area network (WLAN), e.g., Wi-Fi, to connect server 130 and other devices to the wider Internet via server provider 125.

Figure 2:
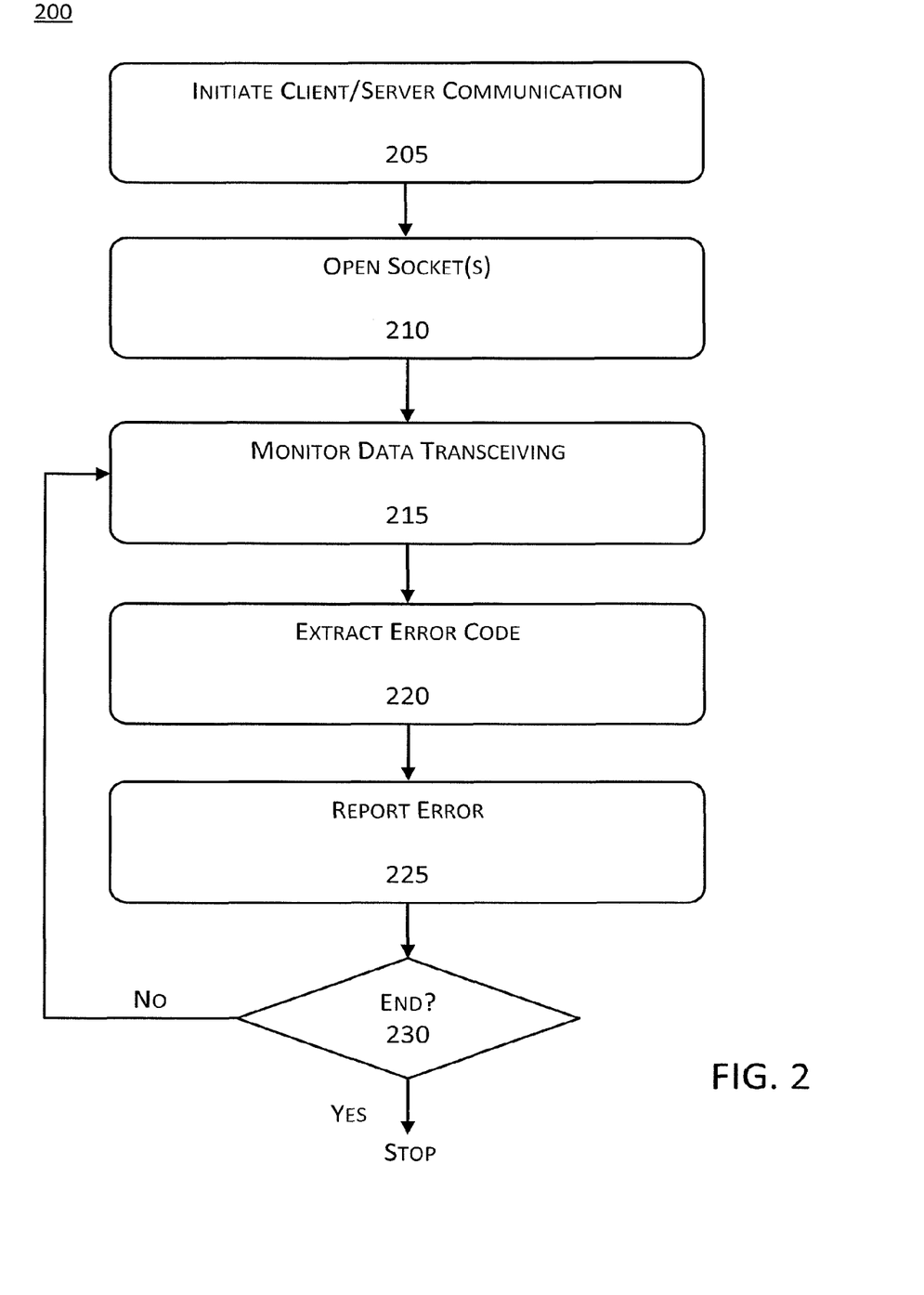
FIG. 2 shows an example processing flow for monitoring connection quality, in accordance with at least the embodiments described regarding FIG. 1.

FIG. 2 shows an example processing flow 200 for monitoring connection quality, in accordance with at least the embodiments described regarding FIG. 1. Processing flow 200 may include various operations, functions, or actions as illustrated by one or more of blocks 205, 210, 215, 220, 225, and/or 230.

More particularly, processing flow 200 shows sub-processes executed by various components that are part of system configuration 100. However, processing flow 200 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description.

Further, as previously set forth, various embodiments of system configuration 100, and therefore processing flow 200 as well, contemplate that the presence of client firewall 115 and server firewall 140, respectively, is optional relative to each other. That is, the embodiments described herein may contemplate the presence of both client firewall 115 and server firewall 140 or one of client firewall 115 and server firewall 140. In the following description of processing flow 200, attention is drawn to any embodiment that requires the presence of both client firewall 115 and server firewall 140 or one of client firewall 115 and server firewall 140.

Block 205 (Initiate Client/Server Communication) may represent bi-directional communication between mobile client 105 and server 130. The communication may include, as non-limiting examples, the downloading of an application from sever 130 to mobile client 105, a request for data from mobile client 105 to server 130, the transmission of data from server 130 to mobile client 105, the start of a multi-player interactive game played on mobile client 105 and hosted/facilitated by server 103, communicative transmissions over a social network application, etc. Processing flow 200 may proceed to block 210.

Block 210 (Open Socket(s)) may represent both of client socket 110 and server socket 135 opening, for each connection between one of multiple mobile clients 105 and server 130. Processing flow 200 may proceed to block 215.

Block 215 (Monitor Data Transceiving) may represent monitor 117 and monitor 142, on either of client firewall 115 and server firewall 140 respectively, monitoring data transceiving at, respectively, client socket 110 and server socket 135. As set forth above, monitors 117 and 142, respectively corresponding to client firewall 115 and server firewall 140, may be in the form of software, hardware, firmware, or any combination thereof; and may be configured to monitor the status of client socket 110 and server socket 135, respectively, to determine whether there are any transceiving errors.

For instance, monitor 117 and/or monitor 142 may send frequent heartbeat signals to client socket 110 or server socket 135 respectively, based upon which the respective monitor may analyze the performance of transceiving at the respective socket.

In the event that a transceiving error is determined to occur, the monitor is to determine the type of error from the extracted error code. Thus, whether at client firewall 115, server firewall 140, or both client firewall 115 and server firewall 140, monitor 117 and monitor 142 respectively check at least the following:

whether the respective network system has failed;
whether the respective network is accessible;
whether the respective network has dropped the connection on reset;
whether the connection was aborted;
whether the connection was reset by a peer;
whether there are sufficient memory resources at the respective network;
whether the received/transmitted message length is beyond an acceptable length for the respective network;
whether the service provider is invalid;
whether the service provider has failed to initialize; and
whether there are sufficient resources to maintain the connection at the desired bandwidth and data rate.

Accordingly, at block 215, either or both of client socket 110 and server socket 135 is configured to check for errors at any socket corresponding to the respective firewall that may affect, to any degree, the quality of service or quality of experience for the user of mobile client 105 in particular. Processing flow 200 may proceed to block 220.

Block 220 (Extract Error Code) may refer to extracting an error code of the last error that occurred at either client socket 110 or server socket 135, by monitor 117 or monitor 142 respectively, if these detect that an error code had been locked. In sockets each error code corresponds to a specific error condition. The monitor 117 and/or monitor 142 may then analyze the obtained error code and determine the actual error from the error code definition/description. Processing flow 200 may proceed to block 225.

Block 225 (Report Error) may refer to obtaining error description corresponding to the error code obtained being transmitted from the detecting one of monitor 117 and monitor 142 to service provider 125. Thus the service provider 125 may identify the error and take steps to correct the identified error, whether automatically or manually. Processing flow 200 may proceed to block 230.

Block 230 may refer to a determination at either or both of monitor 117 and monitor 142 as to whether processing between mobile client 105 and server 130 has ended.

If the determination at block 230 is "no," then processing flow 200 may return to block 215, at which data transceiving is monitored.

If the determination at block 230 is "yes," then processing flow 200 may stop.

Figure 3:
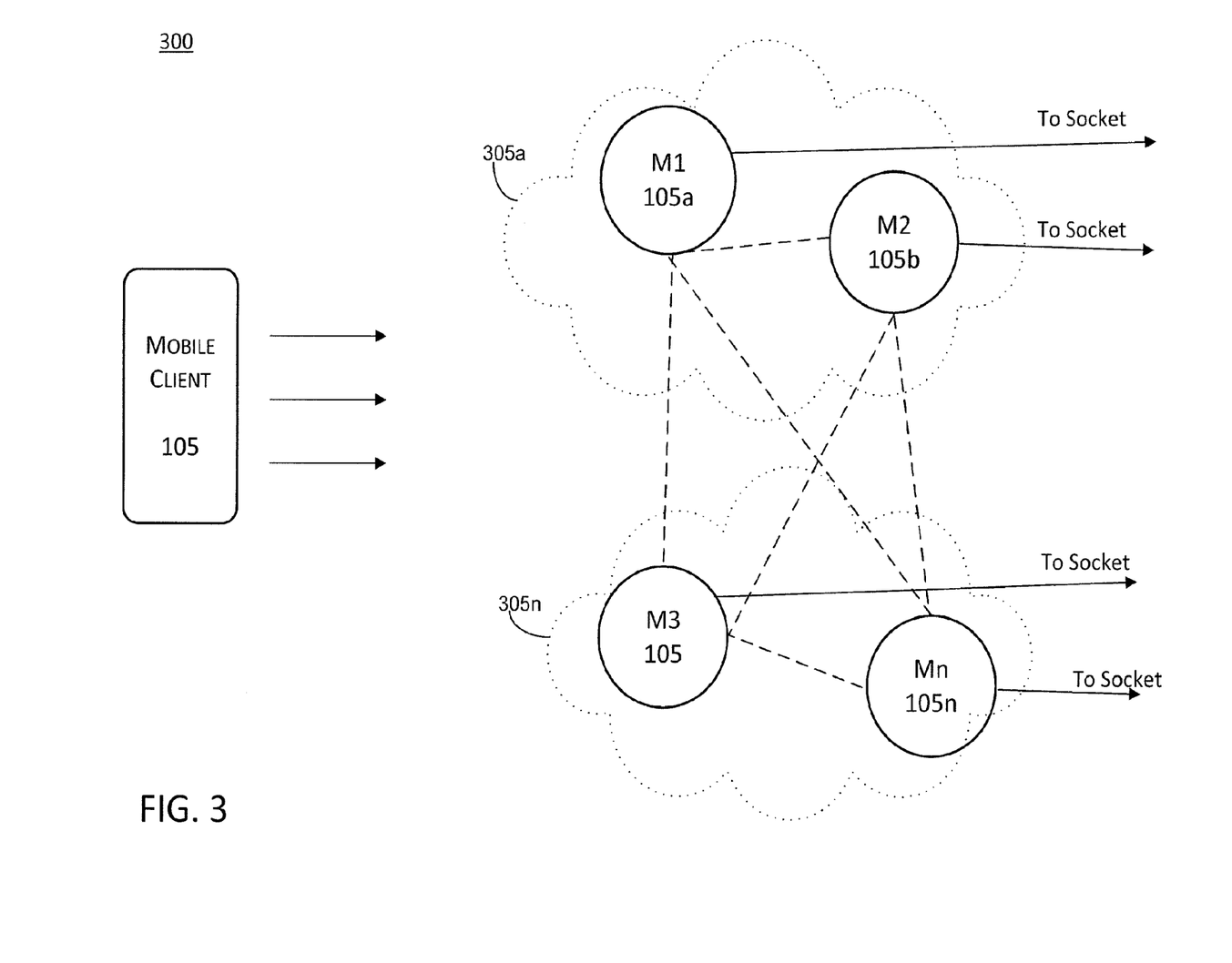
FIG. 3 shows an example configuration of multiple mobile clients, in accordance with various embodiments described herein.

FIG. 3 shows an example configuration 30 of multiple mobile clients in accordance with one or more embodiments described herein. As depicted in FIG. 3, configuration 300 may include mobile clients M1105a, M2105b, M3105c, . . . , Mn105n. Further, mobile clients M1105a and M2105b may be connected to or otherwise associated with cloud/network 305a, and mobile clients M3105c, . . . Mn105n may be included within or otherwise associated with cloud/network 305n. The embodiments of configuration 300 are not limited to the depiction of mobile clients M1105a, M3105b, M2105c, . . . , Mn105n. Obvious modifications may be made by adding further mobile clients or grouping the depicted clients in an alternative manner.

As stated above, there may be multiple mobile clients 105 in configuration 100. Accordingly, mobile clients M1105a, M2105b, M3105c, . . . , Mn105n may refer to further representations of mobile client 105, including any one of computing devices, including, e.g., mobile phones, smart phones, laptop computers, tablet/slate devices, personal digital assistants (PDAs), global positioning system (GPS) devices, or gaming devices that may be communicatively connected to other devices, e.g., a server, via a wireless network, e.g., a wireless local area network technology (WLAN), e.g., Wi-Fi.

As depicted in FIG. 3 and with further reference to FIG. 1, for each of mobile clients M1105a, M2105b, M3105c, . . . , Mn105n, unique dedicated client-server sockets 110 and 135 respectively, may be opened for each of the mobile clients for which a connection is made, directly or indirectly, to server 130. Such connection from mobile client to socket is indicated in FIG. 3.

As set forth above regarding FIGS. 1 and 2, configuration 300, relative to configuration 100, may provide an architecture and processing by which quality of service and quality of experience may be maintained, with the identification, analysis, and reporting of any errors occurring on a network level, thus leaving client devices and servers unburdened.

Accordingly, if, for example, a connection from mobile client M1105a to server 130 was interrupted due to a failure at service provider 125 or at server 130, the depicted peer-to-peer connections amongst all of mobile clients M1105a, M2105b, M3105c, . . . , Mn105n may enable performance data pertinent to mobile client M1105a to be sent to, or received from, server 130 via any other one of mobile clients M2105b, M3105c, . . . Mn105n. In particular, server 130 may store the respective IP addresses for all mobile clients M1105a, M2105b, M3105c, . . . , Mn105n forming a peer-to-peer network. The respective IP addresses may be utilized to locate an error at a particular one of the mobile clients using geolocation techniques.

Cloud/network 305a and cloud/network 305n may refer to a grouping or association of various ones of mobile clients M1105a, M2105b, M3105c, . . . , Mn105n based on any one of, e.g., network connectivity, geolocation, etc. As depicted in FIG. 3, mobile clients M1105a and M2105b are connected to or otherwise associated with cloud/network 305a, and mobile clients M3105c, . . . , Mn105n are connected or otherwise associated with cloud/network 305n.

According to at least one embodiment of configuration 300, relative to configuration 100, clouds/networks 305a and 305n may refer, respectively, to different internet protocol (IP) addresses. For example, mobile clients M1105a and M2105b may be located in Country X having example IP addresses of 165.21.5.3 and 165.21.25.88, respectively; and mobile clients M3105c, . . . , Mn105n may be located in Country Z having example IP addresses of 202.14.250.18 and 202.14.6.99, respectively. The respective ones of client sockets 110 corresponding to any one of mobile clients M1105a, M2105b, M3105c, . . . , Mn105n may be capable of determining the location of connection errors based on geolocation, e.g., at a country level or, alternatively, at a corporate level, based on IP addresses of the respective mobile clients. That is, through an efficient programming code the monitoring device at the firewall may extract the IP address for the respective mobile clients. Geolocation techniques may be utilized, further, to locate the respective mobile clients based on the respective IP addresses.

According to at least one embodiment of configuration 300, relative to configuration 100, clouds/networks 305a and 305n may refer, respectively, to different geographic coordinates, i.e., latitude and longitude. Accordingly, the respective ones of client sockets 110 corresponding to any one of mobile clients M1105a, M2105b, M3105c, . . . , Mn105n may be capable of determining the location of connection errors based on geolocation, e.g., based on geolocation configuration.

Accordingly, system configurations 100 and 300, by processing flow 200, may provide one or more architecture embodiments and processing flows by which quality of service and quality of experience may be maintained, with the identification, analysis, and reporting of any errors occurring on a network level, thus leaving client devices and servers unburdened. Such capabilities may have critical business implications in a professional and recreational world that relies on robust transmission of data and real-time interaction.

Figure 4:
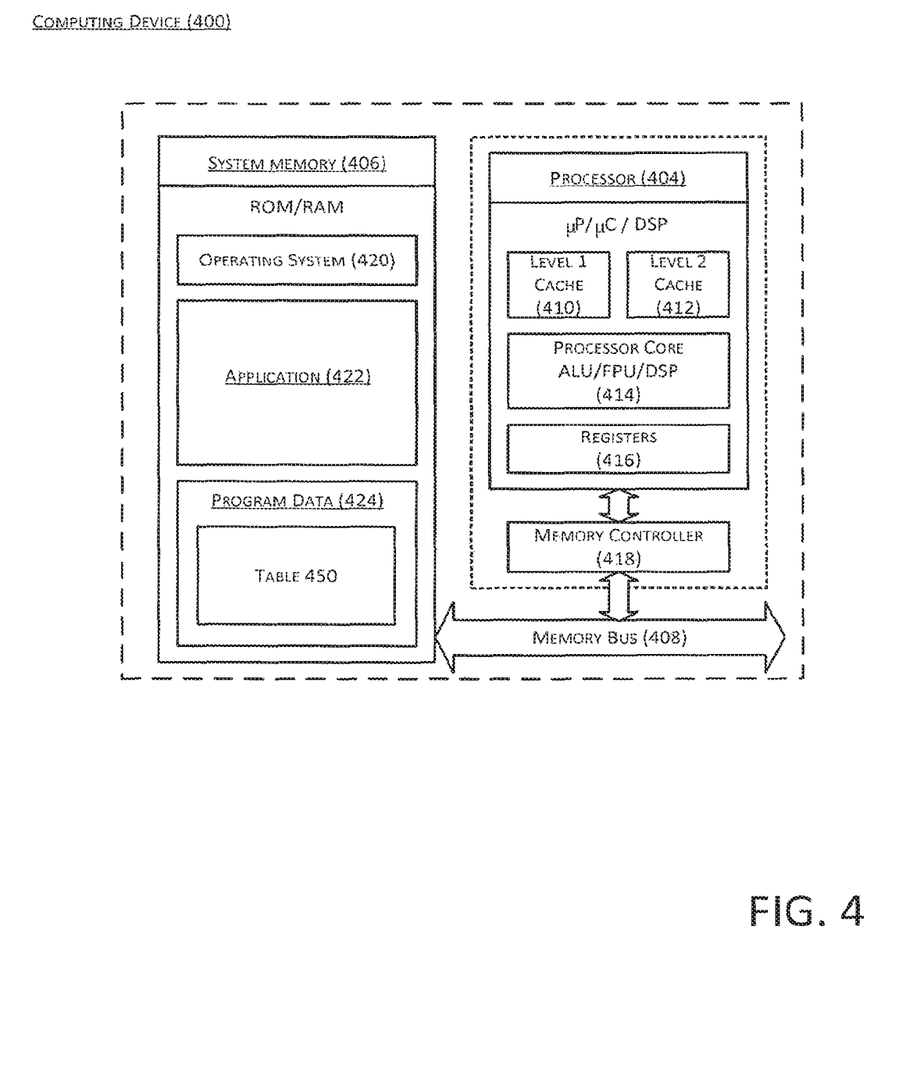
FIG. 4 shows a block diagram illustrating an example computing device by which various embodiments of the example solutions described herein may be implemented.

FIG. 4 shows a block diagram illustrating an example computing device 400 by which various embodiments of the example solutions described herein may be implemented.

More particularly, FIG. 4 shows an illustrative computing embodiment, in which any of the processes and sub-processes described herein may be implemented as computer-readable instructions stored on a computer-readable medium. The computer-readable instructions may, for example, be executed by a processor of mobile client 105, a network element, and/or any other computing device, particularly as applicable to the applications and/or programs described above corresponding to the configuration 100 for monitoring connection quality.

In a very basic configuration, a computing device 400 may typically include one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one or more levels of caching, such as a level one cache 410 and a level two cache 412, a processor core 414, and registers 416. An example processor core 414 may include an arithmetic logic unit (ALU), a floating point unit (FPU), a digital signal processor core (DSP Core), or any combinations thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include the aforementioned applications or programs that are arranged to perform the functions which are described previously with respect to FIGS. 1 and 2. Program data 424 may include a table 450, which may be useful for implementing actuation of appropriate components or modules as described herein.

System memory 406 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as mobile client 105 or, alternatively, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably coupled", to each other to achieve the desired functionality. Specific examples of operably coupled include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A non-transitory computer-readable medium to store one or more executable instructions that, when executed, cause one or more processors to:
   monitor, by a firewall, data signal transceiving at a communications socket, the firewall configured to ping the communications socket to monitor the data signal transceiving by, at least, monitoring a heartbeat signal received from the communications socket;
   determine, by the firewall, that an error has occurred in connection with at least one identified facet of the data signal transceiving by checking performance of multiple facets of the transceiving upon receiving every instance of the heartbeat signal;
   assign, by the firewall, an error code to the identified facet;
   determine, by the firewall, whether the error has occurred in connection with insufficient bandwidth or insufficient memory resources based on the error code; and
   report, by the firewall, the error in connection with the at least one identified facet, along with the error code, to an error correcting entity for correction.

2. The computer-readable medium of claim 1, wherein the firewall is at least one of a client-side firewall or a server-side firewall.

3. The computer-readable medium of claim 1, wherein the communications socket is a client socket.

4. The computer-readable medium of claim 1, wherein the communications socket is a server socket.

5. The computer-readable medium of claim 1, wherein the multiple facets includes available bandwidth for the data signal transceiving, and wherein further the determined error includes insufficient bandwidth.

6. The computer-readable medium of claim 1, wherein causing the one or more executable instructions, when executed, to report the error includes causing the one or more processors to send an error report to an internet service provider.

7. The computer-readable medium of claim 1, wherein causing the one or more executable instructions, when executed, to report the error includes causing the one or more processors to send an error report to an application-hosting server.

8. The computer-readable medium of claim 6, wherein the error report includes a time at which the error occurred.

9. A system, comprising:
   a client communicatively connected to a service provider;

a server communicatively coupled to the client; and a firewall configured to:

monitor communications at a socket level by pinging a socket by, at least monitoring a heartbeat signal received from the socket, identify an error in communications at the socket by checking performance of multiple facets of data transceiving upon receiving every instance of the heartbeat signal, determine whether the error has occurred in connection with insufficient bandwidth or insufficient memory resources, and transmit, to a correcting entity, an error code corresponding to the identified error for correction.

10. The system of claim 9, wherein the firewall is a client-side firewall.

11. The system of claim 9, wherein the firewall is a server-side firewall.

12. The system of claim 9, wherein the firewall is a client-side firewall configured to monitor communications at a client-side socket, and wherein the system further includes a server-side firewall configured to monitor communications at a server-side socket.

13. The system of claim 9, wherein the firewall is configured to monitor communications at a socket level using select and poll functions.

14. The system of claim 11, wherein the firewall is configured to monitor communications at a socket level for a client that is disconnected from the server, via another client that is connected to both the server and the client that is disconnected from the server.

15. The system of claim 11, wherein the firewall is configured to monitor communications at a socket level for a client that is disconnected from the server using pattern recognition of IP addresses for other clients that are connected to the server.

16. The system of claim 11, wherein the firewall is configured to monitor communications at a socket level for a client that is disconnected from the server based on geographic information of other clients that are connected to the server.

17. The system of claim 9, wherein the correcting entity is an internet service provider.

18. The system of claim 9, wherein the correcting entity is an application-hosting server.

19. A method, comprising:

acknowledging, by a firewall, transceiving of data at a socket;

pinging, by the firewall, the socket to analyze transceiving performance at the socket;

monitoring, by the firewall, a heartbeat signal received from the socket;

identifying, by the firewall, an error based on the pinging by checking performance of multiple facets of the transceiving upon receiving every instance of the heartbeat signal;

associating, by the firewall, an appropriate error description to an error code corresponding to the identified error, wherein the appropriate error description includes whether the error has occurred in connection with insufficient bandwidth or insufficient memory resources; and reporting, by the firewall, the error to an appropriate entity for correction.

20. The method of claim 19, wherein the transceiving is between a mobile client and an application server, and wherein further the identified error includes a geolocation of the mobile client.

21. The method of claim 19, wherein the transceiving is between a mobile client and an application server, and wherein further the identified error includes an IP address of the mobile client.

* * * * *